United States Patent [19]

Iso et al.

[11] Patent Number: 4,675,855
[45] Date of Patent: Jun. 23, 1987

[54] REPRODUCING RATE CONTROL APPARATUS FOR INFORMATION RECORDING DISC

[75] Inventors: Yoshimi Iso; Harushige Nakagaki; Masafumi Nakamura, all of Yokohama, Japan

[73] Assignee: Hitachi, Ltd., Tokyo, Japan

[21] Appl. No.: 596,417

[22] Filed: Apr. 3, 1984

[30] Foreign Application Priority Data

Apr. 4, 1983 [JP] Japan .................................. 58-59064

[51] Int. Cl.$^4$ ...................... G11B 21/08; G11B 27/10; G11B 19/24
[52] U.S. Cl. ........................................ 369/32; 369/50; 369/43; 369/240; 369/111; 369/33; 360/73; 360/72.2
[58] Field of Search .................... 369/32, 30, 50, 43, 369/240, 111, 267, 33; 360/73, 72.2

[56] References Cited

U.S. PATENT DOCUMENTS

| | | | |
|---|---|---|---|
| 3,893,178 | 7/1975 | Sordello | 360/73 |
| 4,223,349 | 9/1980 | Dakin | 369/50 |
| 4,236,050 | 11/1980 | Winslow | 360/73 |
| 4,338,683 | 7/1982 | Furukawa | 369/50 |
| 4,439,849 | 3/1984 | Nobeshima | 369/50 |
| 4,450,552 | 5/1984 | Marcantonio | 369/267 |
| 4,530,083 | 7/1985 | Ishihara | 369/240 |

*Primary Examiner*—Alan Faber
*Attorney, Agent, or Firm*—Antonelli, Terry & Wands

[57] ABSTRACT

A reproducing rate control apparatus for an information recording disc in which pieces of information and absolute times for respective information pieces (representative of the reproduction time measured from the innermost circumference of the information recording disc) are recorded on the disc at a constant linear velocity, a revolution number of the disc at a command position is predicted, rotation of a disc drive motor is controlled so that the disc rotates at a predicted revolution number, and an information reader adapted to read the information recorded on the disc is moved to the command position when the revolution number controlling is effected or after the revolution number controlling has been completed.

8 Claims, 22 Drawing Figures

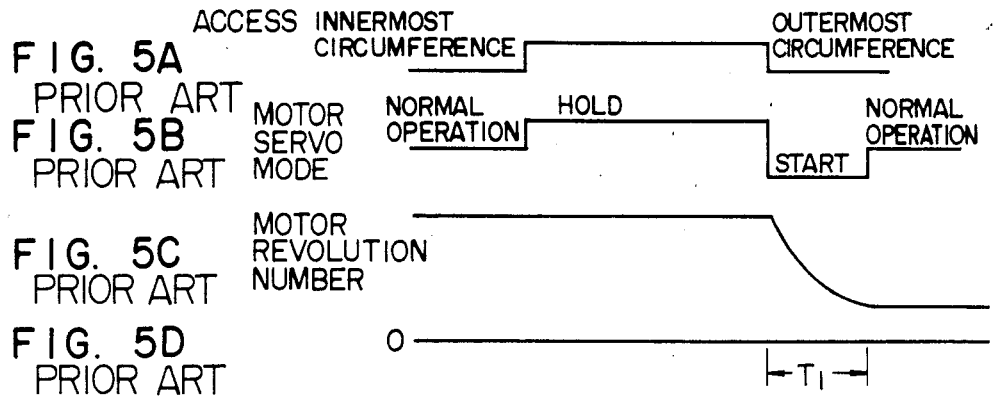
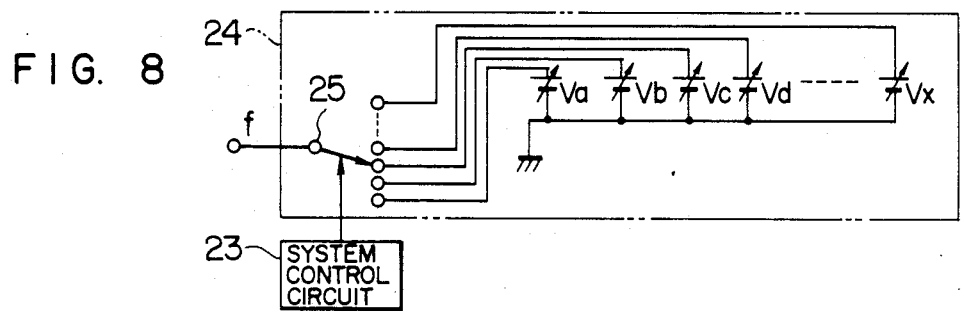
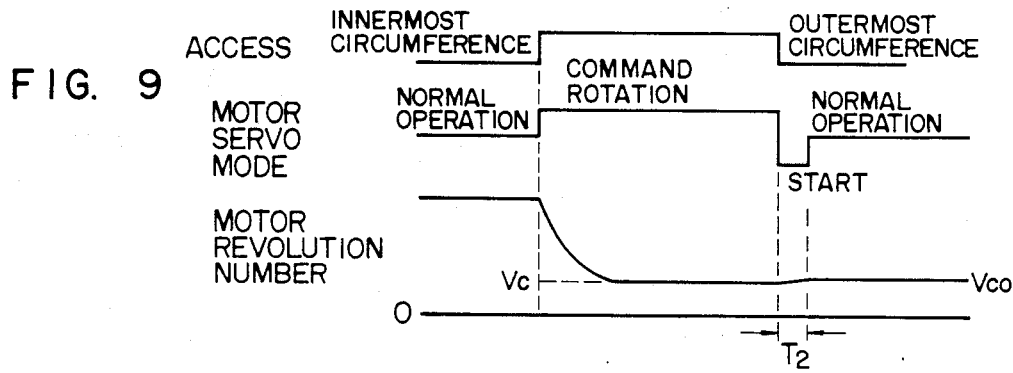
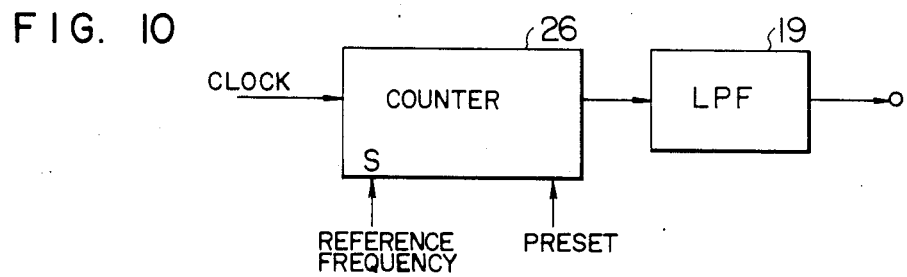

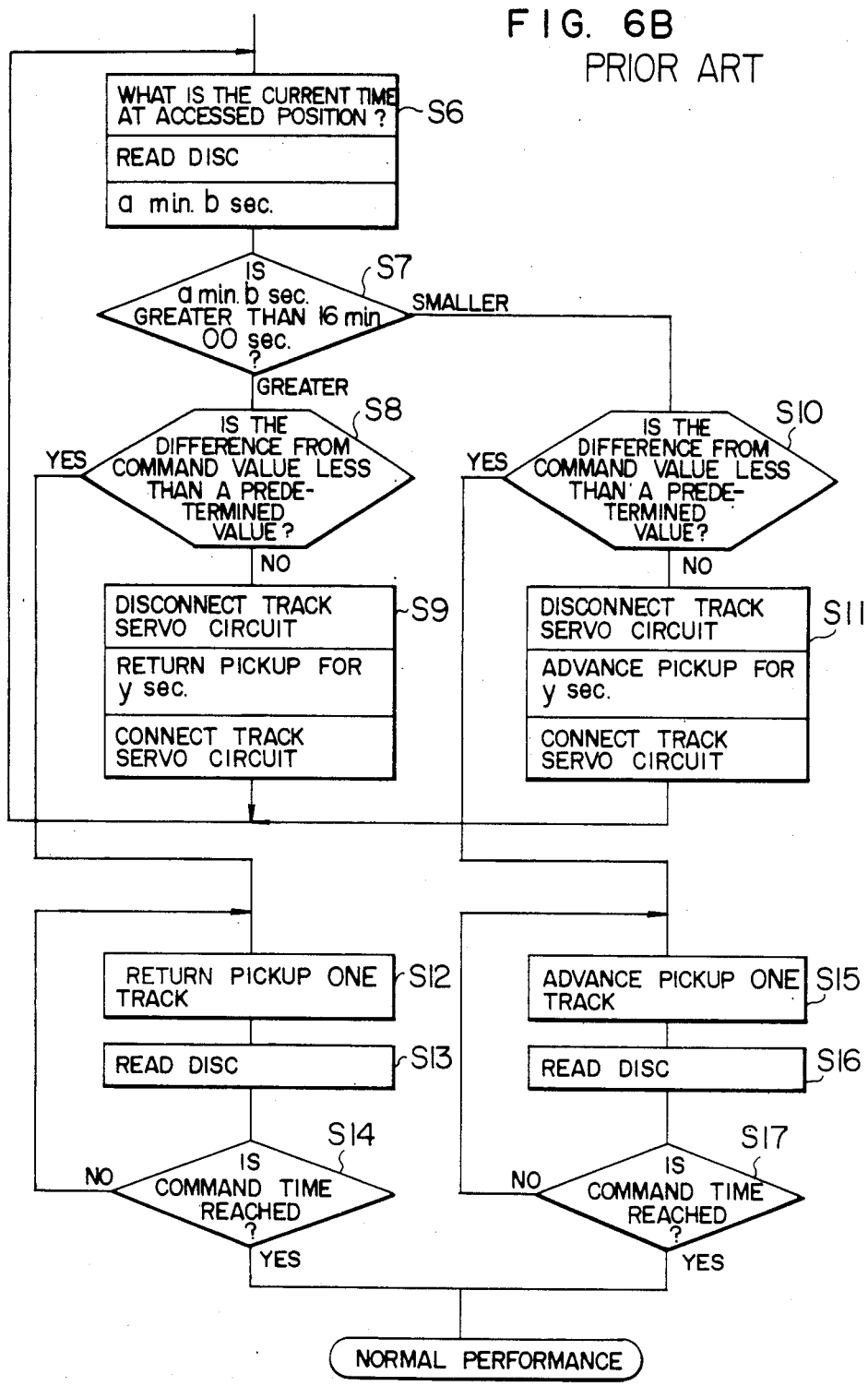

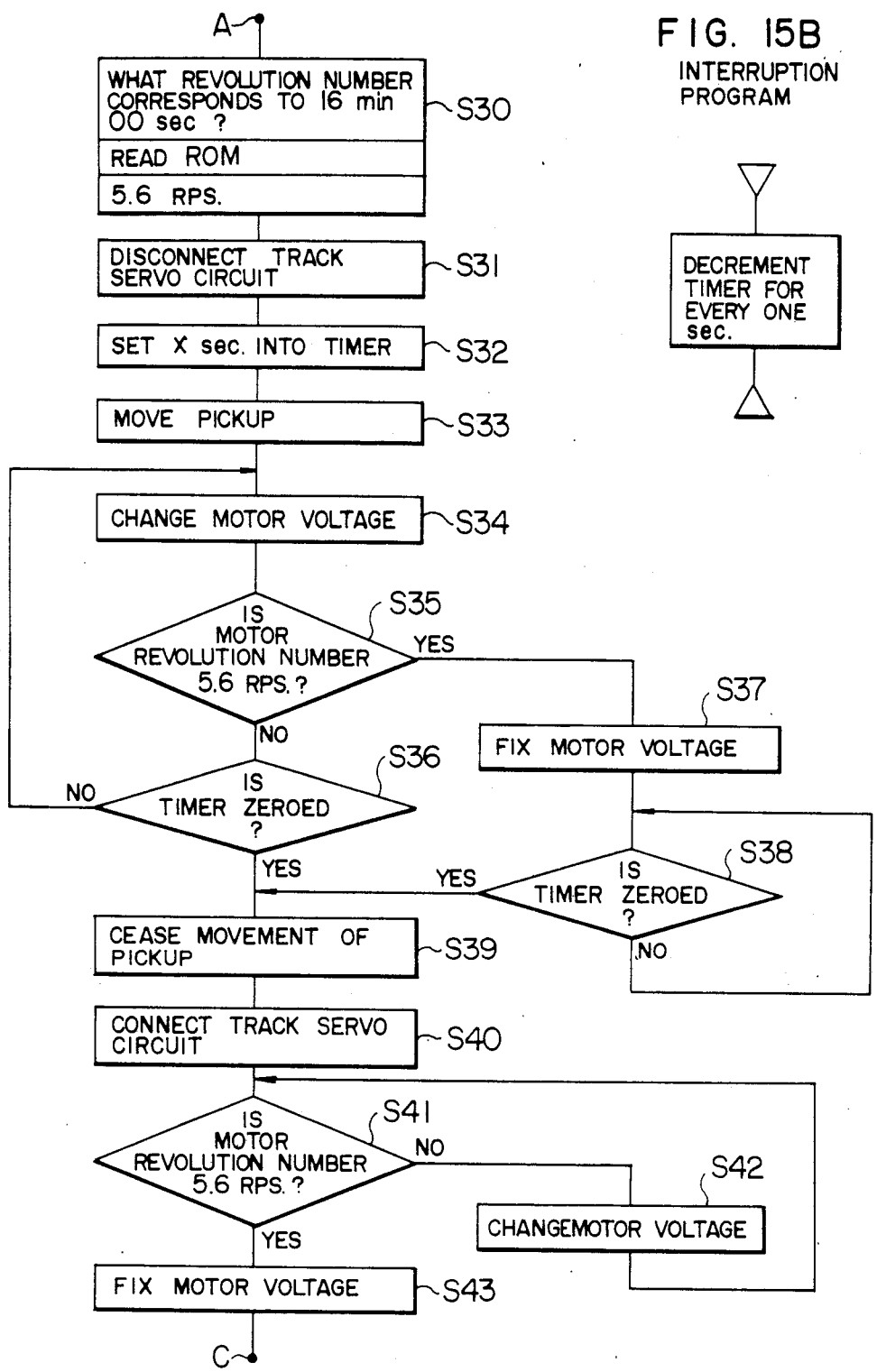

REPRODUCING RATE CONTROL APPARATUS FOR INFORMATION RECORDING DISC

This invention relates to a reproducing rate control apparatus for an information recording disc in which pieces of information are, along with the absolute times for respective information pieces to start (representative of the reproduction time measured from the innermost circumference of the information recording disc), recorded on the disc at a constant linear velocity.

FIG. 1 is a block diagram showing a prior art signal reproducing rate control apparatus for a digital audio disc (DAD).

Referring to FIG. 1, in order to increase the recording density in a digital audio disc 1, a constant linear velocity (CLV) scheme is adopted wherein the signal recording rate is constant at inner and outer circumferential positions of the disc. Accordingly, the revolution number or rotation speed of a motor 2 is changed with the read position of an information reader 32 adapted to read information recorded on the disc. The information reader 32 is fixed on a carriage 33 and as the carriage 33 is driven by a motor 34, the information reader 32 is moved in parallel to the disc 1. The motor 34 is rotated at a constant speed by means of a drive circuit 35 and the parallel movement of the information reader 32 is directed toward the outer circumference of the disc 1 when a switch 36 is transferred to a contact a as shown in FIG. 1 and directed toward the inner circumference of the disc 1 with the switch 36 transferred to a contact b.

A synchronizing signal detecting and regenerating circuit 3 detects a synchronizing signal contained in a signal read out of the disc 1 and produces a synchronizing signal pulse. In the event of loss of the synchronizing signal due to, for example, a scratch on the disc 1, this circuit 3 also functions to generate a pulse which supplements the synchronizing signal at a position where the synchronizing signal is originally scheduled to take place. A recording modulation scheme used imposes restrictions on the regeneration range of the synchronizing signal produced from the synchronizing signal detecting and regenerating circuit 3.

A regeneration range will be explained by taking a modulation scheme as shown in FIGS. 2A and 2B, for instance. In the modulation scheme, though its details are not described herein, it is prescribed that 4.3218 MHz is used as a reference clock frequency. Therefore, the clock period, designated by T, is 1/4.3218 M and the information is recorded on the basis of pulses having widths ranging from 3T to 11T as shown in FIG. 2A. The synchronizing signal is defined by a pattern of two successive 11T width pulses assuming "High" and "Low" or "Low" and "High", and is recorded at a period of 588T. Consequently, the synchronizing signal has a frequency which is 4.3218 MHz/588 = 7.35 KHz.

The synchronizing signal detecting and regenerating circuit 3 is responsive to the clock signal to count a read-out signal so as to exactly discriminate a 11T signal from a 3T, 4T, 5T, . . . or 10T signal to regenerate a synchronizing pulse signal as shown in FIG. 2B. For discrimination of the 11T signal from the 10T signal having a pulse width which is the closest to that of the 11T signal, the 11T signal must have a duration of 10.5T or more. In other words, the synchronizing signal is allowed to have a tolerance of ±0.5/11, i.e., ±4.5%. Thus, it is impossible for the synchronizing signal detecting and regenerating circuit 3 to discriminate the synchronizing signal when the synchronizing signal frequency deviates by more than ±4.5%, and the circuit 3 then stops regenerating the signal.

Returning to FIG. 1, a frequency-voltage converter (hereafter referred to as F-V converter) 6 counts the synchronizing signal frequency and provides a voltage in accordance with a count value. An error amplifier 8 receives, as an input voltage, the output voltage of the F-V converter 6 via a low-pass filter 7, and a voltage in accordance with a difference between the input voltage and a reference voltage 9 is fed back to the motor 2 via a drive amplifier 10. As a result, the revolution number of the motor 2 is controlled so that the information is read out of the disc 1 at a constant rate.

Since the synchronizing signal detecting and regenerating circuit 3 is deactivated when the synchronizing signal frequency deviates by more than ±4.5% as described previously, the synchronizing signal will not be delivered out when starting. Therefore, it is necessary to generate a pseudo-synchronizing signal before the synchronizing signal detecting and regenerating circuit 3 is activated, thereby ensuring that the revolution number of the disc 1 or the motor 2 can approach the normal revolution number. To this end, a pseudo-synchronizing signal generating circuit 5 is provided. A selector 4 is actuated by a discriminator 11 adapted to decide whether the synchronizing signal is detected, so as to be transferred to a contact a when starting and to a contact b under the normal operation.

The operation of the pseudo-synchronizing signal generating circuit 5 will now be described. As described previously, the 3T to 11T pulse width signals are involved in the modulation scheme described herein. The pattern "High" and "Low" or "Low" and "High" of the two successive pulses of the maximum pulse width 11T is used as the synchronizing signal and the period thereof is 588T. Accordingly, even when the synchronizing signal can not be detected, it is possible to determine the pseudo-period of the synchronizing signal by detecting the maximum pulse width and multiplying it with 588/11.

This proceeding is implemented by the pseudo-synchronizing signal generating circuit 5. Included in the circuit 5 is a maximum pulse width detector 12 which counts the pulse width on the basis of narrow pulses having a duration of less than at least T, so as to determine the maximum pulse width value within a fixed time interval. A value obtained from the maximum pulse width detector 12 is multiplied with 588/11 at a calculator 13 to predict the synchronizing signal period. At a pulse generator 14, the narrow pulses used for counting the pulse width are divided at a division ratio equal to a value obtained from the calculator 13 to generate the pseudo-synchronizing signal.

In this manner, whenever the detection of the synchronizing signal is impossible, the pseudo-synchronizing signal is generated by the pseudo-synchronizing signal generating circuit 5 irrespective of the relative position to the disc 1 of the information reader 32 for reading the information signal from the disc 1, to ensure that the motor 2 can be pulled into the normal rotation through a P loop to be described below.

The components 1, 3, 6, 7, 8, 10 and 2 constitute a frequency control loop (hereinafter called P loop) which functions to reduce irregularities in rotation speed.

The revolution number of the motor 2 is determined by the reference voltage 9 but in order to assure accuracy and stability of the synchronizing signal, a phase control loop is provided in addition to the P loop. This phase control loop, generally called an I loop, is constituted with the components 1, 3, 15, 16, 17, 18, 19, 10 and 2, in which, as will be described, the above-mentioned synchronizing signal is phase-compared with a reference signal obtained by frequency-dividing at the frequency divider 16 the output of the reference frequency oscillator 15 and a voltage corresponding to the difference as a result of the phase comparison is applied to the motor 2. Thus, the I loop functions to eliminate a frequency error in the revolution number of the motor 2.

The I loop will be described below. A signal produced from a reference frequency oscillator 15 is subjected to frequency division at the frequency divider 16. With the view of making the frequency of the synchronizing signal coincident with the output frequency of the divider 16, the synchronizing signal is also subjected to frequency division at a frequency divider 17 and the frequency outputs of the two frequency dividers 16 and 17 are inputted to a phase comparator 18 which, in turn, provides a voltage in accordance with a phase difference between the input signals. The output of the phase comparator 18 is added to the P loop via a low-pass filter 19 and then applied to the motor 2 via the drive amplifier 10. Consequently, the revolution number of the motor 2 is locked to the reference frequency of the reference frequency oscillator 15.

Selectors 21 and 22 shown in FIG. 1 are switched over as shown in FIG. 3 by means of a system control circuit 23 comprised of, for example, a microcomputer each time the rotation made of the motor 2 changes.

At the time of starting the motor 2, the synchronizing signal can not occur and therefore, the selector 4 associated with the pseudo-synchronizing signal generating circuit is transferred to the contact a, the selector 22 to a contact c associated with the output of the F-V converter 6, and the selector 21 to a contact g. As a result, the I loop can remain undisturbed before the motor 2 is pulled into the synchronizing signal detection range.

Under the normal operation, the selector 4 is transferred to the contact b, the selector 22 to a contact d and the selector 21 to a contact e, thereby assuring the operation as described previously.

A high rate search (random access) mode will now be described. The innermost circumference of the disc 1 contains a menu zone on which recorded are various kinds of information including the number of tunes and the absolute time for the respective tunes to start (representative of the performance time measured from the innermost circumference). When reproducing the disc, the information reader 32 is first moved to the innermost circumference of the disc 1 to pick up the information and the thus picked up information is stored into, for example, a RAM of the system control circuit 23. Thus, when a desired tune number is to be accessed, the current absolute time is compared with an absolute time allotted to the intended tune to cause the reader 32 to be moved in accordance with a difference, thus assuring rapid accessing.

When moving the reader 32 for reading the information from the disc 1, a track servo circuit 37 for signal track following-up is required to be disconnected by transferring a selector 38 associated with the circuit 37 to a contact b, and as a result, no signal can be obtained from the disc 1 during the movement of the reader 32.

Therefore, it follows that the synchronizing signal will not occur and the pseudo-synchronizing signal generating circuit will not operate correctly, giving rise to dangerous runaway of the motor speed control circuit.

To avoid such inconveniences, when accessing, the selector 21 is transferred to a contact f (see FIG. 3) connected to an output terminal of a hold circuit 20 shown in FIG. 1 which is responsive to the system control circuit 23 to hold a revolution number immediately prior of accessing. In addition, the selector 22 is transferred to a contact d and the output of the hold circuit 20 is applied to the motor 2 to rotate it at a constant speed. Under this condition, the reader 32 is moved by the motor 34 and after completion of the movement, the track servo is recovered by transferring the selector 38 to a contact a so that the track servo circuit 37 can be activated. Thereafter, the selector 22 is transferred to the contact c to activate the motor speed control circuit.

FIG. 4 shows the relation between the radius and the revolution number of the digital audio disc. At the innermost circumference measuring a radius of about 25 mm, the revolution number is about 8 rps and at the outermost circumference measuring a radius of about 60 mm, the revolution number is 3.3 rps.

When a tune recorded on the outermost circumference is desired to be accessed during performance of a tune recorded on the innermost circumference, the motor servo mode is switched over as shown in FIG. 5. More particularly, the motor revolution number allotted to the innermost circumference is held until accessing to the outermost circumference has been completed and thereafter, the motor servo mode is switched to a start mode which changes into a normal mode after a time interval $T_1$.

Referring now to a flow chart shown in FIGS. 6A and 6B, functions of this prior art system control circuit 23 will be described.

Step S1

When the proceeding enters into the random access, it is examined as to what number of tune is to be accessed by reading information stored in the RAM included in the system control circuit 23. For example, a sixth tune is determined. Typically, when the user inputs a number allotted to a tune desired to be performed by depressing selected one of ten keys, data representative of the tune number is inputted to the RAM. Therefore, the tune number to be accessed can be determined by reading the RAM.

Step S2

It is examined as to what absolute time is necessary for the sixth tune to start by reading data stored in the RAM. For example, 16 minutes and 00 second is determined. For determination of the start time, various kinds of data stored in the innermost circumference of the disc as described previously have been read by the system control circuit 23 and stored in the RAM included therein.

Step S3

A travelling time for the information reader (pickup) is calculated from the command time and the current time. For example, x is determined.

Step S4

A current value of the revolution number of the motor for disc rotation is held.

Step S5

The track servo circuit is disconnected and the pickup is moved for x seconds. Thereafter, the track servo circuit is pulled in.

Step S6

A current value of time (absolute value) is read out of the disc when the pickup reaches a desired position. For example, a minutes and b seconds is determined. The absolute value is stored in the signal track.

Step S7

It is decided as to whether a minutes and b seconds is greater than 16 minutes and 00 second. If greater, the proceeding proceeds to a step S8 and if smaller, the preceeding branches to a step S10.

Step S8

It is decided as to whether the difference from the command time is less than a predetermined value. If "YES", the proceeding proceeds to a step S12 and if "NO", it proceeds to a step S9.

Step S9

The track servo circuit is again disconnected and the information reader (pickup) is returned for y seconds. Thereafter, the track servo circuit is pulled in. Subsequently, the proceeding returns to the step S6 and the steps S6, S7, S8 and S9 or the steps S6, S7, S10 and S11 are executed.

Steps S10 and S11

Similar to the steps S8 and S9 and not described.

Step S12

The information reader (pickup) is returned by one track.

Step S13

A current value of time (absolute time) is read out of the disc.

Step S14

It is decided as to whether the current time coincides with the command time. If "YES", normal performance is effected and if "NO", the proceeding returns to the step S12.

Step S15

The information reader (pickup) is advanced by one track.

Step S16

A current value of time is read out of the disc.

Step S17

It is decided as to whether the current time coincides with the command time. If "YES", normal performance is effected and if "NO", the proceeding proceeds to the step S15.

As described above, in the high rate search (random access) according to the prior art apparatus, the waiting time T1 is required for the motor servo operation, whereby after normal operation is reached, the information including the number of tunes and the absolute time is read to further correct accessing (See FIGS. 5A–5D). This correction, as will be seen from the flow chart of FIG. 6, is repeated several times. Consequently, the waiting time T1 for the motor servo operation disadvantageously occupies a large proportion within the entire access time. To reduce the access time, the waiting time T1 must be decreased.

An object of the present invention is to provide a reproducing rate control apparatus capable of reducing the time for high rate search (random access).

The present invention is featured by comprising means for predicting a revolution number of a disc at a command position, means for controlling a motor for rotating the disc so that the disc rotates at a predicted revolution number, and means for moving an information reader adapted to read information recorded on the disc to the command position when the revolution number controlling is effected or after the revolution number controlling has been completed, whereby high rate search (random access) for reading a desired kind of information can be effected.

The present invention is further featured by comprising a disc drive motor revolution number detector, whereby a revolution number detected by the disc drive motor revolution number detector is compared with the predicted revolution number to effect revolution number controlling so that the former revolution number coincides with the latter revolution number.

In the accompanying drawings:

FIGS. 5A–5D are waveform diagrams useful in explaining the relation between the motor servo mode and the motor revolution number during accessing;

FIGS. 6A and 6B show flow chart illustrative of functions of a system control circuit shown in FIG. 1;

FIG. 8 is a circuit diagram of a command voltage output circuit;

FIG. 9 is a similar diagram to FIG. 5 during accessing in accordance with the invention;

FIG. 10 is a block diagram showing another example of the command voltage output circuit;

FIG. 15A is a flow chart illustrative of functions characteristic to a system control circuit in the FIG. 12 embodiment;

FIG. 15B shows an interruption program for use in the flow chart of FIG. 15A.

Figure 1:
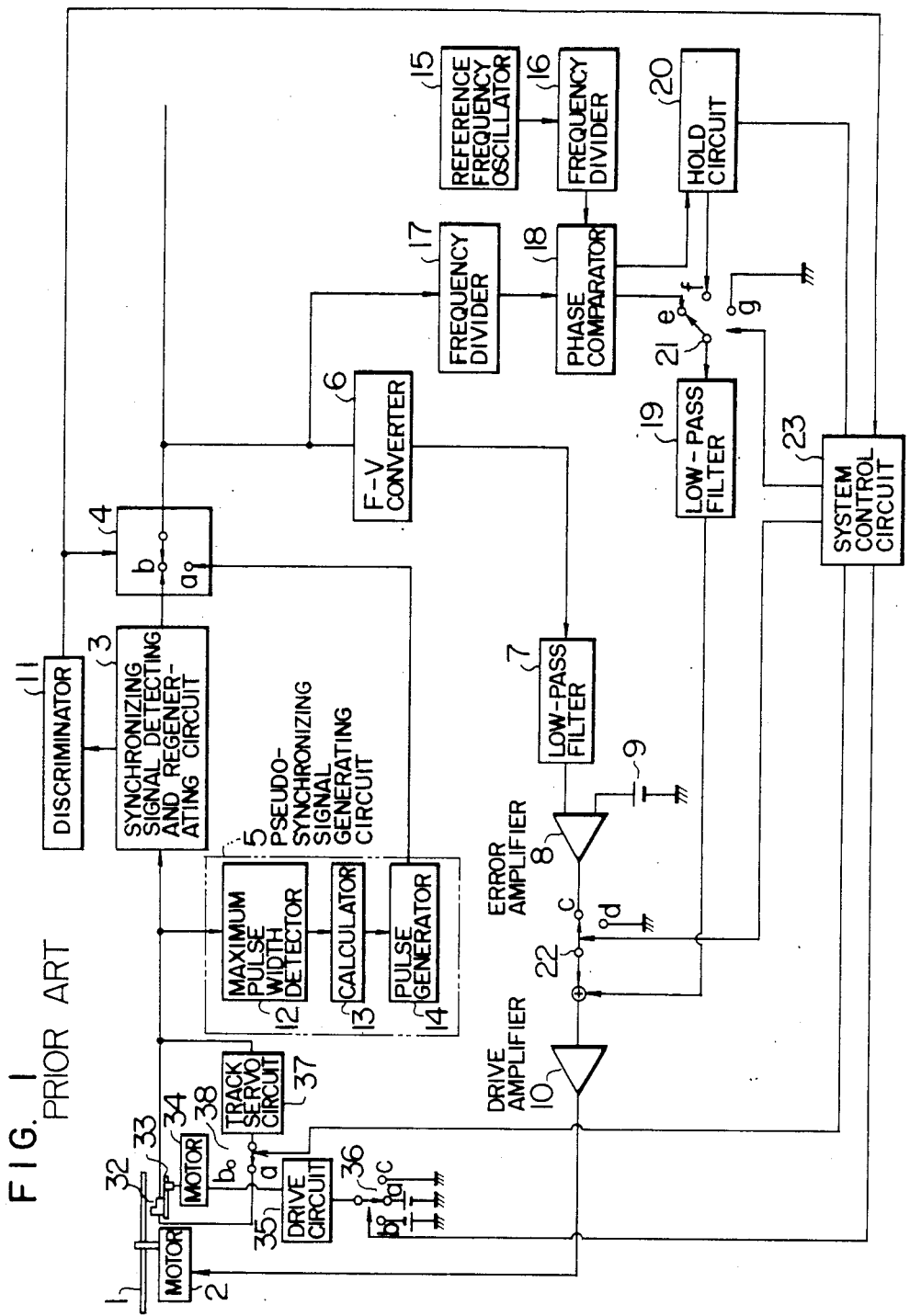
FIG. 1 is a block diagram showing a prior art signal reproducing rate control apparatus.
Figure 2A:
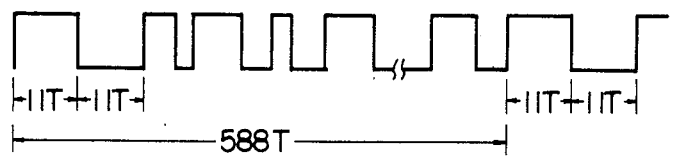
FIGS. 2A and 2B show waveforms in a modulation scheme.
Figure 2B:
Figure 3:
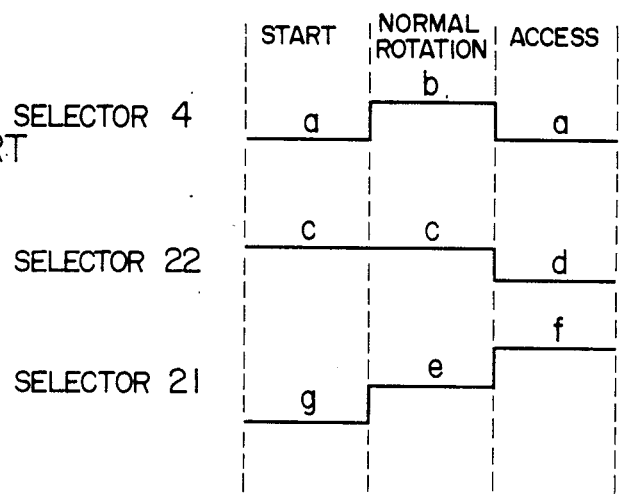
FIG. 3 is a diagram showing switchover states of selectors shown in FIG. 1.
Figure 4:
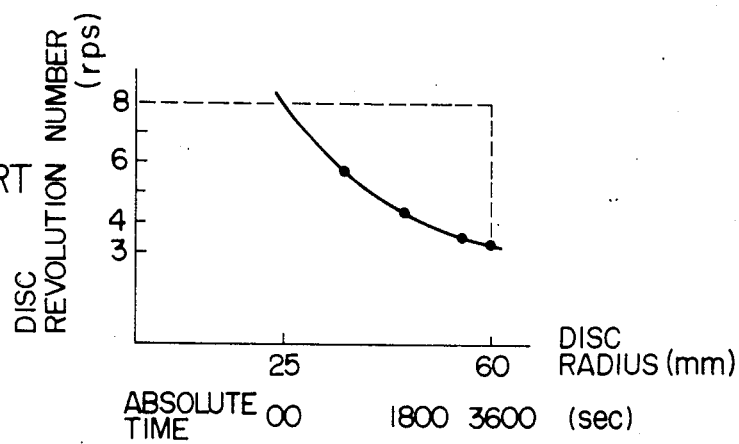
FIG. 4 is a graphical representation showing the relation between the radius and the revolution number of a disc.
Figure 7:
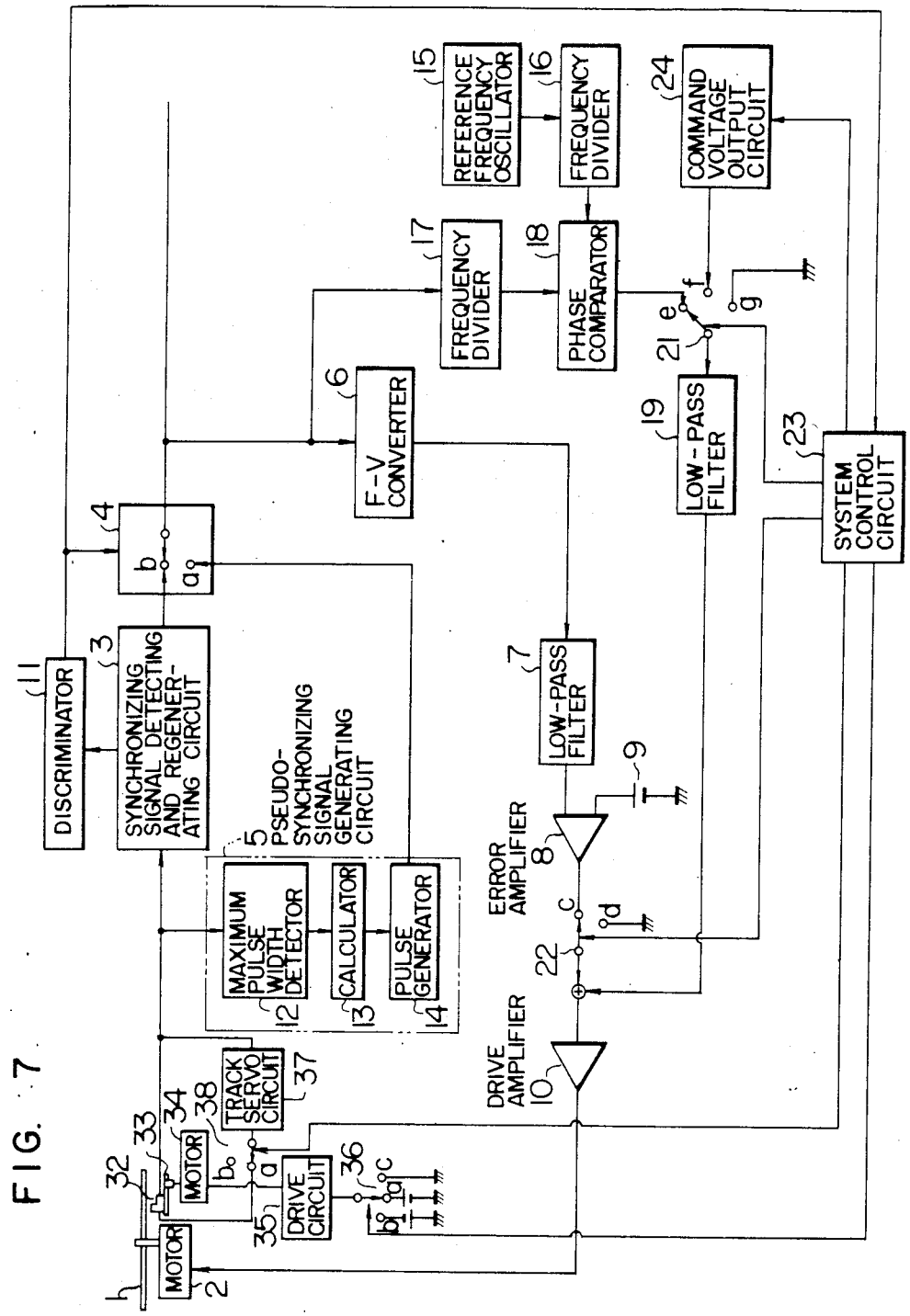
FIG. 7 is a block diagram of a signal reproducing rate control apparatus according to an embodiment of the invention.

Referring now to FIG. 7, there is illustrated a preferred embodiment of a signal reproducing rate control apparatus according to the present invention. In FIG. 7, components corresponding to those in FIG. 1 are designated by identical reference numerals. Reference numeral 24 designates a command voltage output circuit an example of which is illustrated in FIG. 8.

A command voltage output circuit exemplified in FIG. 8 comprises a plurality of voltage sources $V_a$ to $V_x$ with preset voltages (also designated by $V_a$ to $V_x$) and a switch 25 which is controlled by a system control circuit 23. The system control circuit 23 includes a ROM stored with a table as shown in Table 1 below and selects a command revolution number in accordance with an absolute time allotted to a command position under random accessing. The preset voltages $V_a$, $V_b$, $V_c$, ... and $V_x$ supplied from the voltage sources $V_a$ to $V_x$ shown in FIG. 8 correspond to revolution numbers 8.0, 6.8, ... and 3.3 rps listed in Table 1. A motor drive voltage approximating a revolution number at a command position is selected by switching over the switch 25 and applied to a motor 2.

TABLE 1

| Absolute time allotted to command position | Revolution number (rps) |
|---|---|
| 0000 to 0360 | 8.0 |
| 0361 to 0720 | 6.8 |
| 0721 to 1080 | 5.6 |
| . | . |
| . | . |
| . | . |
| 3241 to 3600 | 3.3 |

Status of high rate search (access) is illustrated in FIG. 9. In this embodiment, a voltage corresponding to a command revolution number, for example, $V_c$ is first set prior to effecting high rate search (access) and thereafter, an information reader 23 is moved for accessing. After the accessing has been completed, the motor servo mode is switched to a start mode, which is followed by a normal mode for normal rotation. This high rate search according to teachings of the present invention is different from the prior art high rate search described with reference to FIG. 5 in that when the start mode is reached, the revolution number has already been in close proximity of the command revolution number $V_{co}$. Consequently, a time interval $T_2$ required for pulling the motor servo mode into the normal mode can be reduced as compared to the time interval $T_1$ shown in FIG. 5. The time interval $T_2$ can be substantially zeroed if the difference from the command revolution number is allowed to fall within ±5% by increasing the number of the voltage sources shown in FIG. 8.

The command voltage output circuit 24 may also be constituted by a well known PWM wave generator utilizing a clock pulse and a counter.

FIG. 10 shows an example of the PWM wave generator. A counter 26 is set by a reference frequency and is preset by a rectangular wave having a fixed period and a duty ratio varying according to an absolute time allotted to a command position. A low-pass filter 19 corresponds to that shown in FIG. 7.

Since the counter 26 is set by the reference frequency, a signal at a constant frequency is delivered to the low-pass filter 19. However, the duty cycle of a rectangular waveform output from the counter 26 is varied with the preset value and therefore, a voltage delivered out of the low-pass filter 19 can correspond to the command revolution number allotted to the command random accessing position.

Figure 6A:
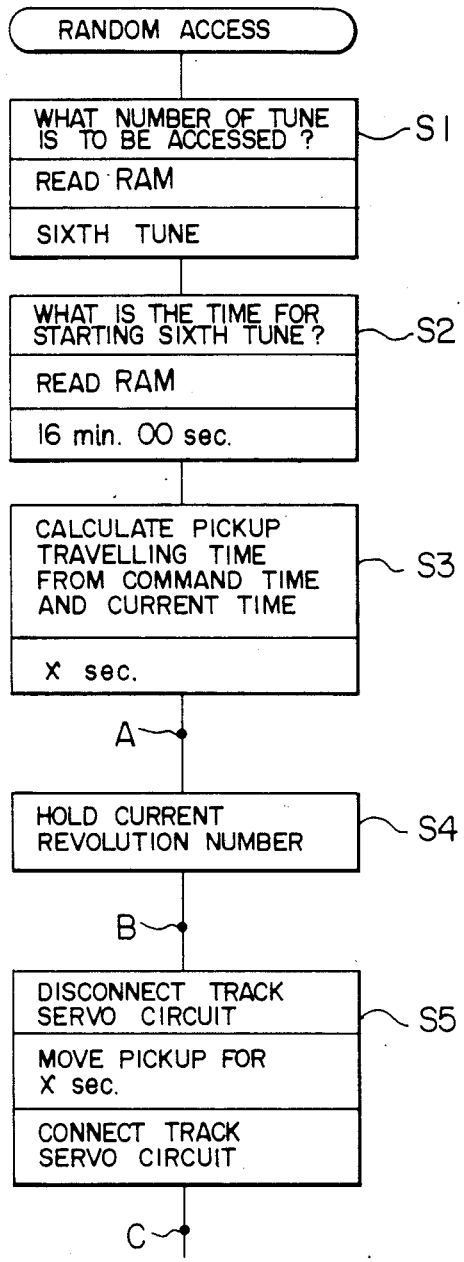
Figure 11:
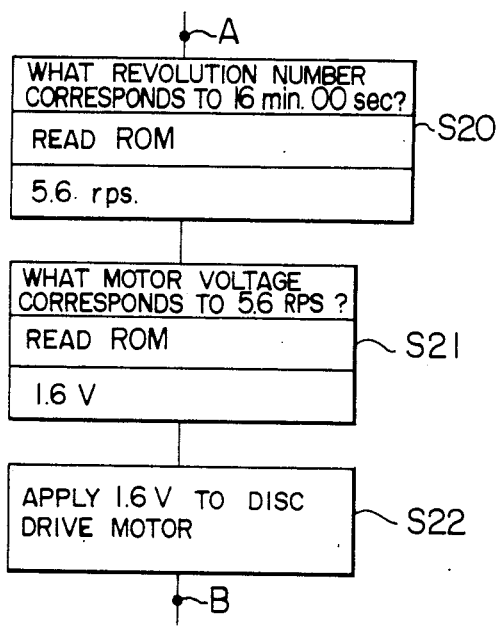
FIG. 11 is a flow chart illustrative of functions characteristic to a system control circuit in the FIG. 7 embodiment.

A flow chart as shown in FIG. 11 is illustrative of functions characteristic to the system control circuit 23 of FIG. 7 and it substitutes for the step S4 between points A and B in the FIG. 6 flow chart. In other words, the function of the FIG. 7 system control circuit can be described by replacing the step S4 in FIG. 6 with steps S20 to S22 in FIG. 11.

As far as the steps S1 to S3 and the steps S5 to S17 in the prior art example of FIG. 6 are concerned, the FIG. 7 system control circuit 23 performs the same functions and only the steps S20 to S22 shown in FIG. 11 will be described below.

Step S20

A revolution number of the disc corresponding to 16 minutes and 00 second which is read out of the RAM in the step S2 is read out of the ROM included in the system control circuit 23. For example, 5.6 rps is thus determined.

Step S21

A value of disc motor drive voltage corresponding to the 5.6 rps revolution number is determined by reading data stored in the ROM. For example, 1.6 V is determined.

Step S22

The switch 25 in FIG. 8 is so transferred as to apply the 1.6 V voltage determined in the step S21 to the disc drive motor 2.

Figure 12:
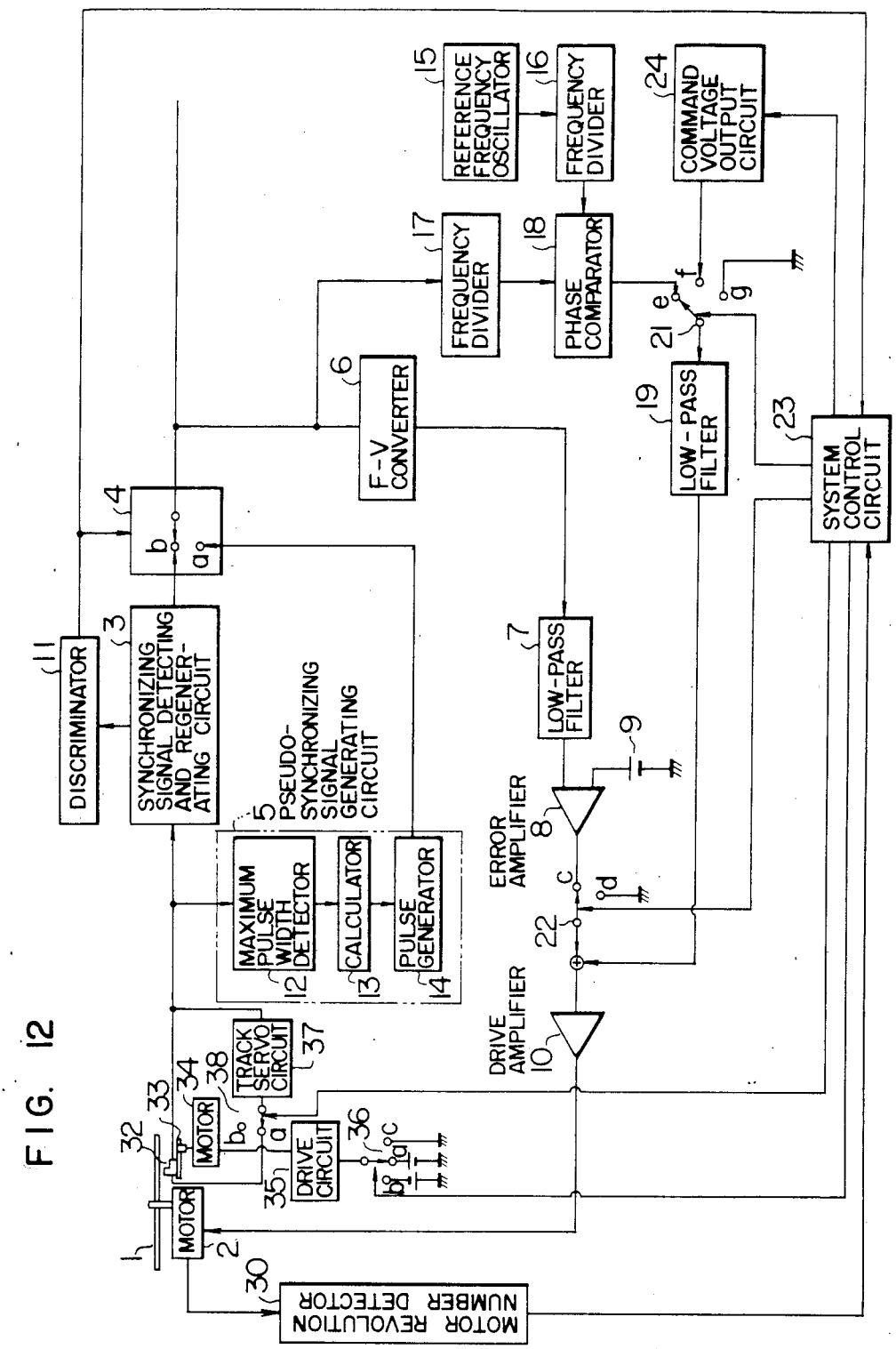
FIG. 12 is a block diagram showing another embodiment of the signal reproducing rate control apparatus according to the invention.

FIG. 12 shows another embodiment of the apparatus according to the present invention wherein a motor revolution number detector 30 is added, with the remaining components corresponding to those in FIG. 7 designated by identical reference numerals.

The FIG. 7 apparatus is disadvantageous in that an error in the command revolution number is caused when voltage-revolution number characteristics of the disc motor fluctuate or when the voltage-revolution number characteristics are so affected by disc load characteristics as to vary.

In order to cancel out the error, in the embodiment shown in FIG. 12, information is inputted to a command voltage output circuit 24 and thereafter, an output of the revolution number detector 30 is compared with a predicted command revolution number and correction data is fed to the command voltage output circuit 24, thereby approximating the motor revolution number to the command revolution number.

Figure 13:
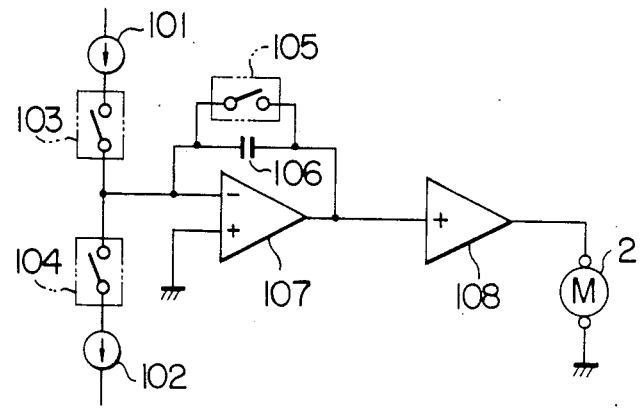
FIG. 13 is a circuit diagram showing still another example of the command voltage output circuit.
Figure 14:
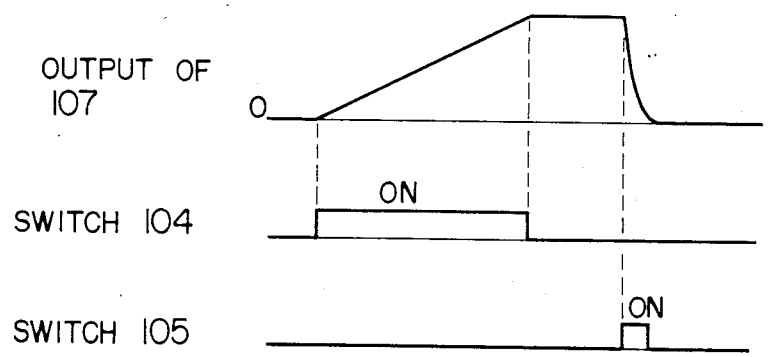
FIG. 14 is a waveform diagram useful in explaining the operation of the FIG. 13 circuit.

FIG. 13 illustrates a command voltage output circuit 24 suitable for the FIG. 12 embodiment and FIG. 14 illustrates waveforms useful in explaining the operation of the FIG. 13 circuit.

The command voltage output circuit 24 as shown in FIG. 13 comprises constant current sources 101 and 102, switches 103, 104 and 105 which are on-off controlled by a system control circuit 23, a capacitor 106, an operation amplifier 107, and a buffer 108. The motor 2 is driven by the output from the buffer 108. An integration amplifier comprised of the capacitor 106 and operation amplifier 107 and the two, positive and negative, constant current sources 101 and 102 constitute a ramp function generator.

Detection data from the revolution number detector 30 shown in FIG. 12 is compared with data of a predicted command revolution number at the system control circuit 23. When a revolution number of the motor is smaller than the command revolution number, the system control circuit 23 turns on the switch 104. Then, the output of the ramp function generator, i.e., of the operation amplifier 107 increases as shown in FIG. 14, which increases the revolution number of the motor 2. Subsequently, when the revolution number of motor 2 detected by the revolution number detector 30 reaches the command revolution number, the system control circuit 23 turns off the switch 104. As a result, the output of the operation amplifier is maintained at a constant value.

Conversely, when the revolution number of motor 2 detected by the revolution number detector 30 is larger than the command revolution number, the switch 103 is turned on. The switch 105 is a switch for resetting the command voltage after a random access has been finished.

FIG. 15A shows a flow chart illustrative of functions characteristic to the system control circuit 23 of FIG. 12 and the flow chart substitutes for the steps S4 and S5 between points A and C in the FIG. 6 flow chart. In other words, the function of the FIG. 12 system control circuit can be described by replacing the steps S4 and S5 in FIG. 6 with steps S30 to S43 in FIG. 15A.

As far as the steps S1 to S3 and the steps S6 to S17 in the prior art example of FIG. 6 are concerned, the FIG. 12 system control circuit 23 performs the same functions and only the steps S30 to S43 shown in FIG. 15 will be described below.

Step S30

A revolution number of the disc corresponding to an absolute time of 16 minutes and 00 second which is read out of the RAM in the step S2 is read out of the ROM included in the system control circuit 23. For example, 5.6 rps is thus determined.

Step S31

The selector 38 is transferred to contact b to disconnect the track servo circuit.

Step S32

The x seconds determined in the step S3 is inputted to a timer included in the system control circuit 23 which determines a desired travelling time of the information reader 32.

Step S33

The information reader (pickup) is moved.

Step S34

Voltage of the disc drive motor 2 is varied to change the revolution number of the motor 2.

Step S35

It is decided as to whether the revolution number of the disc drive motor 2 is 5.6 rps. If "NO", the proceeding proceeds to the step S36 and if "YES", it proceeds to the step S37.

Step S36

It is decided as to whether the timer is zeroed. The timer is decremented one by one second under an interruption program shown in FIG. 15B. If "YES" indicating that the information reader has moved for x seconds before the revolution number of the disc drive motor reaches 5.6 rps, the proceeding proceeds to the step S39.

Step S37

When the revolution number of the disc drive motor reaches 5.6 rps prior to lapse of the x seconds, the proceeding proceeds to this step S37 in which the disc drive motor voltage is fixed.

Step S38

It is decided as to whether the timer is zeroed. After lapse of the x seconds, the proceeding proceeds to the step S39.

Step S39

The movement of the information reader (pickup) is ceased.

Step S40

The track servo circuit is connected.

Step S41

It is decided as to whether the revolution number of the disc drive motor is 5.6 rps. If "NO", the proceeding proceeds to the step S42 and if "YES", it proceeds to the step S43.

Step S42

Voltage of the disc drive motor is varied.

Step S43

The disc drive motor voltage is fixed.

If the proceeding proceeds to the step S39 by way of the steps S34 to S36, there is no chance of fixing the disc drive motor voltage. In this case, fixation of the motor voltage is carried out in the steps S41 to S43. Conversely, if the proceeding proceeds to the step S39 by way of the steps S34, S35, S37 and S38, the disc drive motor voltage is fixed in the step S37 with the result that the voltage fixation is doubled in the step S43. However, such a doubled voltage fixation arises no inconveniences in the operation.

Figure 16:
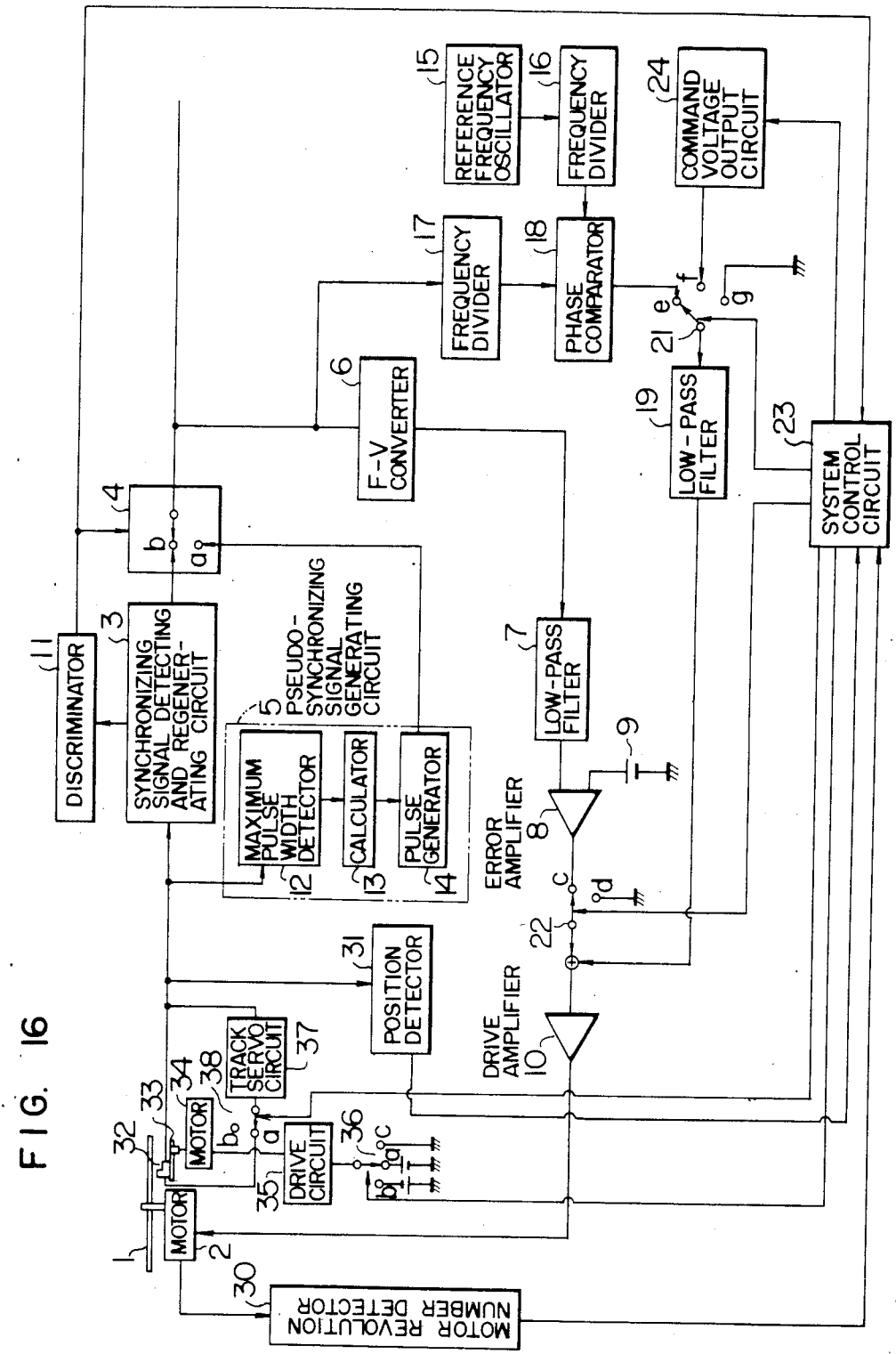
FIG. 16 is a block diagram showing still another embodiment of the signal reproducing rate control apparatus according to the invention.

FIG. 16 shows still another embodiment of the apparatus according to the invention wherein a position detector 31 for the information reader is added. In CD type discs, it is stipulated that the recording linear velocity falls within a range of from 1.2 m/S to 1.4 m/S. Accordingly, in a disc having information recorded at a linear velocity of 1.2 m/S, the predicted command revolution number deviates from that pursuant to an absolute time-revolution number correspondence table established under a calculation condition of 1.4 m/S.

To cope with this problem, the information reader position detector 31 detects a disc radius R at a reading position, and a linear velocity v is calculated in accordance with a formula, $v=2\pi R \cdot f$, by using a revolution number f detected by the revolution number detector 30.

Thus, various absolute time-revolution number correspondence tables corresponding to the different linear velocities are stored in advance in the ROM included in the system control circuit 23 and a correspondence table corresponding to a calculated linear velocity is selected, thereby making it possible to minimize errors in the predicted revolution number due to variations in the linear velocity.

As has been described, according to the present invention, the time for pulling the disc motor mode into the normal rotation after the high rate search (random access) can be minimized and hence the time for the high rate search (random access) can advantageously be minimized.

We claim:

1. A reproducing speed control apparatus for a disc reproducing system having motor means for rotating an information disc for reproduction at a constant linear velocity, the information disc having pieces of information recorded at a constant linear velocity and data indicative of time periods necessary for reproduction of said recorded information pieces recorded at the constant linear velocity, each of said time periods of reproduction being measured from the innermost circumference of said disc, data indicative of the number of said recorded information pieces and of the beginning of said recorded information pieces being also recorded on said disc, means for driving said motor means, an information reader movable radially of said disc for reading information from said disc, means for moving said information reader in the radial direction of said disc, and memory means for storing data indicative of the number of and the beginning of the recorded information pieces of said information disc under reproduction, the reproducing speed control apparatus comprising:

means for establishing a rotation speed of said motor means for providing said constant linear velocity of said disc with said information reader being disposed at an information reading position for reproducing a desired one of said recorded information pieces and for producing a command signal representative of said established rotation speed, said establishing and producing means being associated with said memory means so that the establishment of said motor rotation speed is effected in accordance with said data indicative of the number of and the beginning of the recorded information pieces;

motor control means responsive to said command signal from said establishing and producing means for applying a voltage corresponding to said command signal to said motor driving means for rotating said motor means at said established rotation speed; and means for controlling said information reader moving means so that said information reader is moved to said information reading position one of during a change of the rotation speed of said motor means to said established rotation speed and after completion of a change of the rotation speed of said motor means to said established rotation speed.

2. A reproducing speed control apparatus according to claim 1, wherein said motor control means include a plurality of voltage sources each capable of supplying a voltage corresponding to a different rotation speed of said motor means established by said establishing and producing means, said information reader being positioned at one of a plurality of information reproducing positions as a result of a radial movement with respect to said disc effected by said information reader moving means, and switch means responsive to said command signal for selecting one of said plurality of voltage sources for application of the voltage of the selected voltage source to said motor driving means.

3. A reproducing speed control apparatus according to claim 1, wherein said motor control means includes a PWM wave generator comprising a counter set by a rectangular wave with a constant period and having a duty ratio variable depending upon the time period of reproduction of a desired one of recorded information pieces with said information reader being positioned at an information reproducing position for enabling reproduction of said desired recorded information piece.

4. A reproducing speed control apparatus according to claim 1, further comprising means for detecting the rotation speed of said motor means, said rotation speed detecting means being coupled to said establishing and reproducing means so that the output of said rotation speed detecting means and said established rotation speed are compared and the comparison is utilized to control the rotation speed of said motor means.

5. A reproducing speed control apparatus according to claim 4, wherein said motor control means includes a ramp generator having an integration amplifier and two constant current sources of different polarities.

6. A reproducing speed control apparatus according to claim 4, further comprising means for detecting the position of said information reader, means coupled to said position detecting means and said rotation speed detecting means for determining the linear velocity of a disc under reproduction at which information recording has been effected on the disc under reproduction on the basis of the outputs of said position detecting means and said rotation speed detecting means, said establishing and reproducing means including plural sets of establishing and reproducing units each unit capable of establishing a different set of rotation speeds of said motor means and capable of producing command signals representative of the established rotation speed, each of said sets of established rotation speeds being for a different one of constant linear velocities for said disc ranging from 1.2 m/sec to 1.4 m/sec, and means responsive to the output of said linear velocity determining means for selecting one of said plural sets of establishing and reproducing units so that establishment of a rotation speed is effected as a result of said selection of one establishing and reproducing unit.

7. A reproducing speed control apparatus according to claim 1, wherein said means for controlling said information reader moving means moves said information reader to said information reading position simultaneously with a change of the rotation speed of said motor means to said established rotation speed.

8. A reproducing speed control apparatus according to claim 1, wherein said means for controlling said information reader moving means moves said information reader to said information reading position after completion of a change of the rotatition speed of said motor means to said established rotation speed.

* * * * *